United States Patent
Roentgen et al.

(10) Patent No.: US 12,209,904 B2
(45) Date of Patent: Jan. 28, 2025

(54) MULTI-CHANNEL INFEROMETER-BASED OPTICAL SENSOR

(71) Applicant: ams Sensors Singapore Pte. Ltd., Singapore (SG)

(72) Inventors: Peter Roentgen, Eindhoven (NL); Kotaro Ishizaki, Eindhoven (NL); Javier Miguel Sanchez, Eindhoven (NL)

(73) Assignee: ams Sensors Singapore Pte. Ltd., Singapore (SG)

( * ) Notice: Subject to any disclaimer, the term of this patent is extended or adjusted under 35 U.S.C. 154(b) by 0 days.

(21) Appl. No.: 17/778,387

(22) PCT Filed: Jun. 21, 2021

(86) PCT No.: PCT/SG2021/050354
§ 371 (c)(1),
(2) Date: May 19, 2022

(87) PCT Pub. No.: WO2022/005391
PCT Pub. Date: Jan. 6, 2022

(65) Prior Publication Data
US 2023/0304861 A1     Sep. 28, 2023

(30) Foreign Application Priority Data

Jun. 29, 2020 (GB) .................................. 2009904

(51) Int. Cl.
*G01J 3/26* (2006.01)
*G01J 3/02* (2006.01)
(Continued)

(52) U.S. Cl.
CPC ............... *G01J 3/26* (2013.01); *G01J 3/0259* (2013.01); *G01J 3/0294* (2013.01); *G01J 3/36* (2013.01); *G01J 3/51* (2013.01)

(58) Field of Classification Search
CPC .......... G01J 3/26; G01J 3/0259; G01J 3/0294; G01J 3/36
See application file for complete search history.

(56) References Cited

U.S. PATENT DOCUMENTS

| 9,182,276 B2 * | 11/2015 | Kawasaki | ............ G01J 1/4228 |
| 2009/0236525 A1 * | 9/2009 | Mitra | ........................ G01J 3/36 356/519 |

(Continued)

FOREIGN PATENT DOCUMENTS

| JP | 2006220623 A * | 8/2006 |
| WO | 2020025263 A1 | 2/2020 |

OTHER PUBLICATIONS

International Search Report and Written Opinion for PCT/SG2021/050354, mailed Oct. 1, 2021, 8 pages.

(Continued)

*Primary Examiner* — Dominic J Bologna
*Assistant Examiner* — Mohamed Doumbia
(74) *Attorney, Agent, or Firm* — VIERING, JENTSCHURA & PARTNER mbB

(57) ABSTRACT

An optical sensor. The optical sensor comprises a substrate, a Fabry-Perot interferometer, and first and second photodetectors. The Fabry-Perot interferometer comprises a first mirror and a second mirror, and is mounted on the substrate such that light is transmitted through the interferometer to the substrate. The first and second photodetectors are configured to detect light transmitted through the etalon and the substrate. The first photodetector is sensitive to a first wavelength range, and the second photodetector is sensitive to a second wavelength range, and wherein the first and second wavelength ranges each correspond to a different mode of the interferometer.

4 Claims, 5 Drawing Sheets

(51) Int. Cl.
  *G01J 3/36* (2006.01)
  *G01J 3/51* (2006.01)

(56) References Cited

U.S. PATENT DOCUMENTS

| | | |
|---|---|---|
| 2010/0139406 A1 | 6/2010 | Stievater et al. |
| 2010/0245832 A1 | 9/2010 | Saari |
| 2014/0368825 A1* | 12/2014 | Rissanen .................. G01J 3/26 356/519 |
| 2018/0188110 A1 | 7/2018 | Goldring et al. |
| 2019/0107484 A1* | 4/2019 | Thrush ..................... G01J 3/26 |
| 2019/0317258 A1 | 10/2019 | Zheng et al. |

OTHER PUBLICATIONS

Search Report for related application, GB2009904.0 , issued Dec. 21, 2020, 3 pages.

* cited by examiner

MULTI-CHANNEL INFEROMETER-BASED OPTICAL SENSOR

CROSS-REFERENCE TO RELATED APPLICATIONS

This application is a 371 U.S. National Phase of PCT International Patent Application No. PCT/SG2021/050354, filed on 21 Jun. 2021, which claims benefit and priority to United Kingdom Application No. 2009904.0, filed on 29 Jun. 2020; the disclosures of which are each incorporated by reference herein in their entirety for all purposes.

FIELD OF THE INVENTION

The present invention relates to optical components. In particular, the present invention relates to wavelength-discriminating optical sensors incorporating interferometers and photodetectors.

BACKGROUND

Miniaturised wavelength discriminating optical sensors are often constructed with an optical interferometer mounted on a substrate, and a detector located below the substrate. For example, in the detector shown in FIG. 1A, the interferometer 101 is a Fabry-Perot interferometer (also known as an etalon), which comprises a top mirror 102, a bottom mirror 103, and MEMS (micro-electro-mechanical system) elements 104 which are configured to control the spacing between the top and bottom mirrors. The interferometer is mounted on a substrate 105, and light which is transmitted by both the interferometer and the substrate is picked up by a detector 106. The wavelength range 111 of this detector is shown in FIG. 1B, and encompasses the minimum 112 and maximum 113 transmission peaks of the interferometer in a particular optical mode (i.e. the peaks corresponding to the maximum and minimum gap between the mirrors, as controlled by the MEMS).

There may be further optical components (e.g. lenses or optical filters) to control light entering the interferometer, or control light transmitted through the substrate. For example, lenses may be used to capture more light, or optical filters may be used to filter out unwanted light (e.g. higher order optical modes of the interferometer).

"Optical" and "light" are used herein to refer to both visible light and adjacent spectral regions—i.e. infra-red and ultra-violet light.

SUMMARY

Detectors such as those described in the background are sensitive to a single mode of the interferometer—i.e. a single set of overtones of the received light. However, in many spectrometry applications, particularly in the near-infrared region, the behaviour of these overtones is highly aharmonic—i.e. they do not behave in a simple fashion, which complicates the identification of molecules from their spectra.

This problem can be mitigated if there is independent detection of light in different overtones, which can then be compared to more accurately determine the cause of the detected wavelengths (i.e. the underlying structure of the molecule).

While spectroscopy is presented as a particular example use case, an optical sensor capable of detecting multiple optical modes of an etalon could be useful in other applications—including color sensors, spectral sensors, or dual-frequency proximity or time of flight sensors.

As such, the present invention provides an optical sensor. The optical sensor comprises a substrate, a Fabry-Perot interferometer, and first and second photodetectors. The Fabry-Perot interferometer comprises a first mirror and a second mirror, and is mounted on the substrate such that light is transmitted through the interferometer to the substrate. The first and second photodetectors are configured to detect light transmitted through the etalon and the substrate. The first photodetector is sensitive to a first wavelength range, and the second photodetector is sensitive to a second wavelength range, and wherein the first and second wavelength ranges each correspond to a different mode of the interferometer.

In order to provide the different wavelength ranges, the first photodetector may comprise a photodiode formed from a first material, and the second photodetector may comprise a photodiode formed from a second material which is different from the first material. In this case, the first material may be transparent to the second wavelength range, and the second photodetector may be located such that light transmitted by the interferometer passes through the first photodetector before reaching the second photodetector.

As an alternative way to provide the different wavelength ranges the first photodetector may comprise an optical filter which blocks at least the second wavelength range and transmits the first wavelength range, and the second photodetector may comprise an optical filter which blocks at least the first wavelength range and transmits the second wavelength range. In this case, the first and second photodetectors may be provided on the same die.

The first mirror may have a greater refractive index than the second mirror, and the second mirror may be located closer to the substrate than the first mirror. For example, the first mirror may be formed from silicon dioxide, $SiO_2$, and the second mirror may be formed from poly-silicon, poly-Si.

DETAILED DESCRIPTION

Figure 1A:
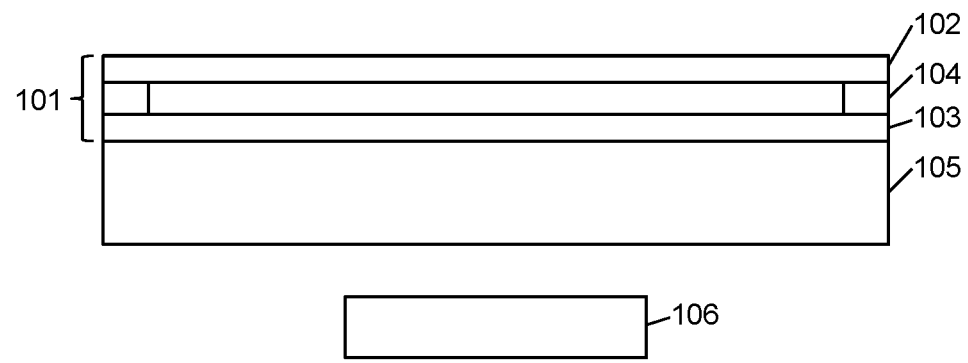
FIG. 1A shows an optical sensor.
Figure 1B:
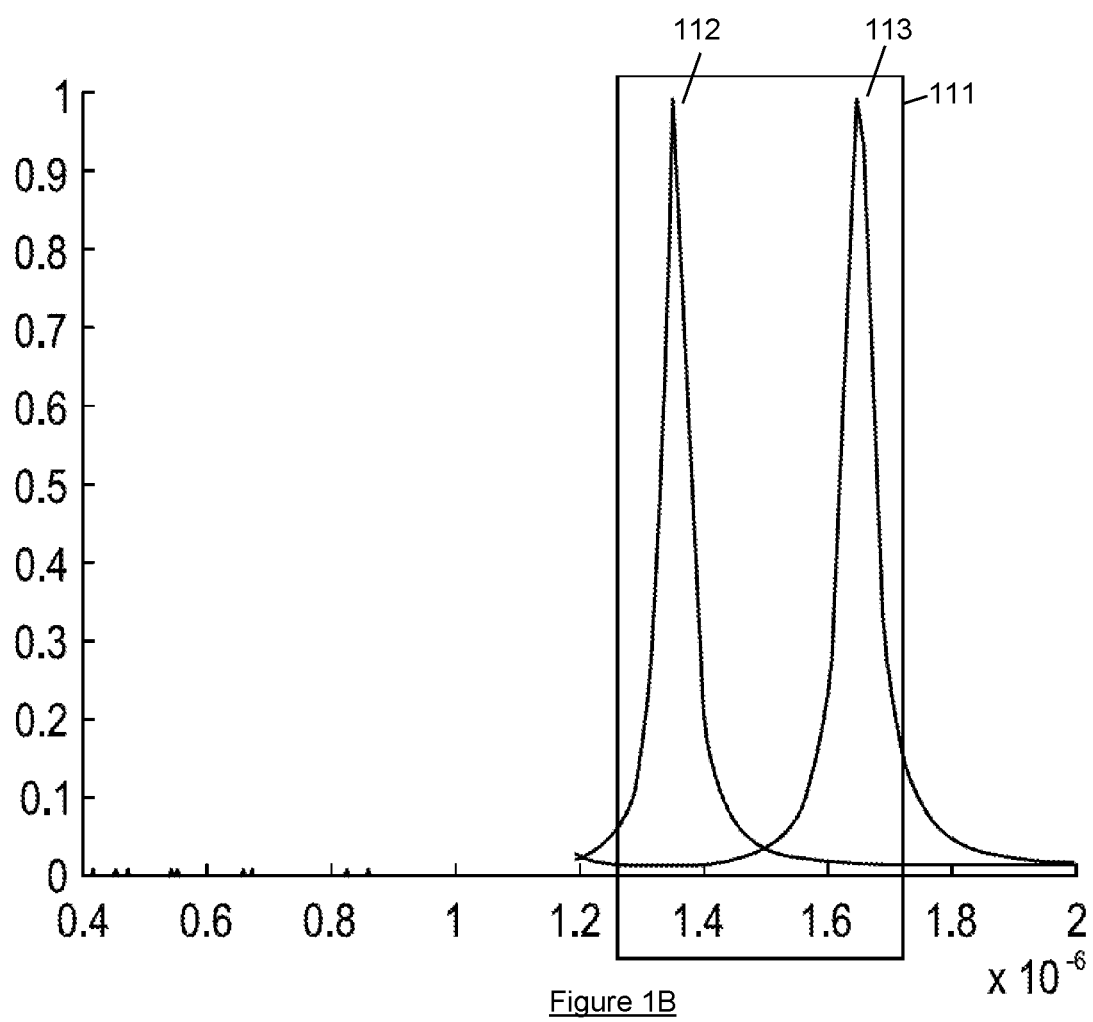
FIG. 1B shows the wavelength range of the sensor of FIG. 1A.

A idealised Fabry-Perot interferometer will have transmission peaks at certain wavelengths depending only on the distance between its mirrors. The transmission peaks satisfy the relationship $\lambda=2d/m$, where d is the distance between the mirrors and m is an integer called the "order of interference" or "optical mode". Existing sensors such as that shown in FIG. 1A operate within a single optical mode—i.e. the sensor is configured to detect light only for a particular optical mode, and light corresponding to the transmission peaks in other modes is either filtered out, in a range which the detector is not sensitive to, or in a range which the interferometer does not transmit (e.g. due to reflection properties of the mirrors).

Operation in a single mode is sufficient for many applications. However, in some instances it would be useful to detect in multiple modes simultaneously—i.e. to simultaneously detect light of wavelength $\lambda_m=2d/m$ and of wavelength $\lambda_n=2d/n$, where m and n are different optical modes. For example, in spectroscopy, it is often difficult to confirm whether a certain species has been detected without comparison across multiple wavelengths, and multiple overtones of that species' characteristic wavelength. An interferometer can be constructed where two of the modes line up with different overtones of the species' characteristic wavelength, allowing both measurements to be taken simultaneously, in principle. Alternatively, this may be used in other applications requiring simultaneous monitoring of two or more different wavelengths—e.g. color sensors, spectral sensors, or dual-frequency versions of proximity or "time of flight" sensors.

Figure 2A:
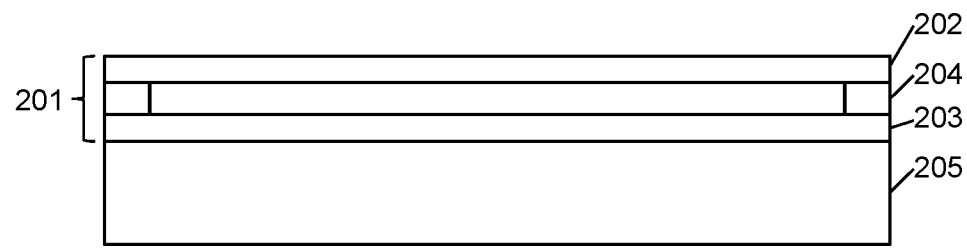
FIG. 2A is a schematic illustration of an exemplary optical sensor.
Figure 2A:
Figure 2B:
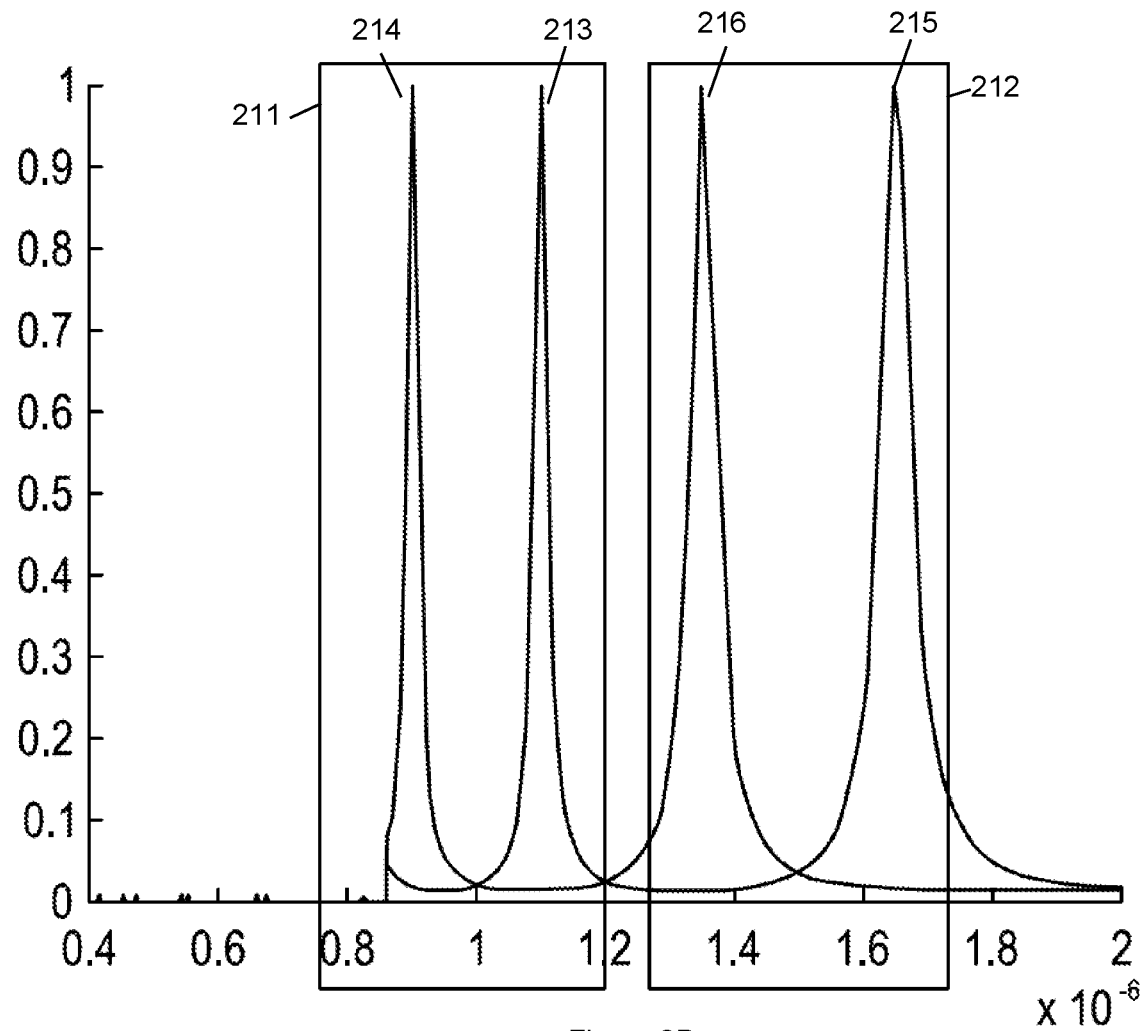
FIG. 2B shows the wavelength range of the sensor of FIG. 2A.

An example of a practical construction of such a sensor is shown in FIG. 2A. The sensor comprises an interferometer 201, which comprises a top mirror 202, a bottom mirror 203, and may comprise MEMS (micro-electro-mechanical system) elements 204 which are configured to control the spacing between the top and bottom mirrors. The interferometer is mounted on a substrate 205, and light which is transmitted by both the interferometer and the substrate is picked up by a first detector 206 and a second detector 207. As shown in FIG. 2B, the first and second detectors are each sensitive to a different wavelength range 211, 212. These wavelength ranges each correspond to different optical modes of the interferometer, so that in operation, the first detector detects the wavelengths transmitted by the first optical mode (maximum 213 and minimum 214 transmission peaks shown), and the second detector detects the wavelengths transmitted by the second optical mode (maximum 215 and minimum 216 transmission peaks shown).

Figure 3:
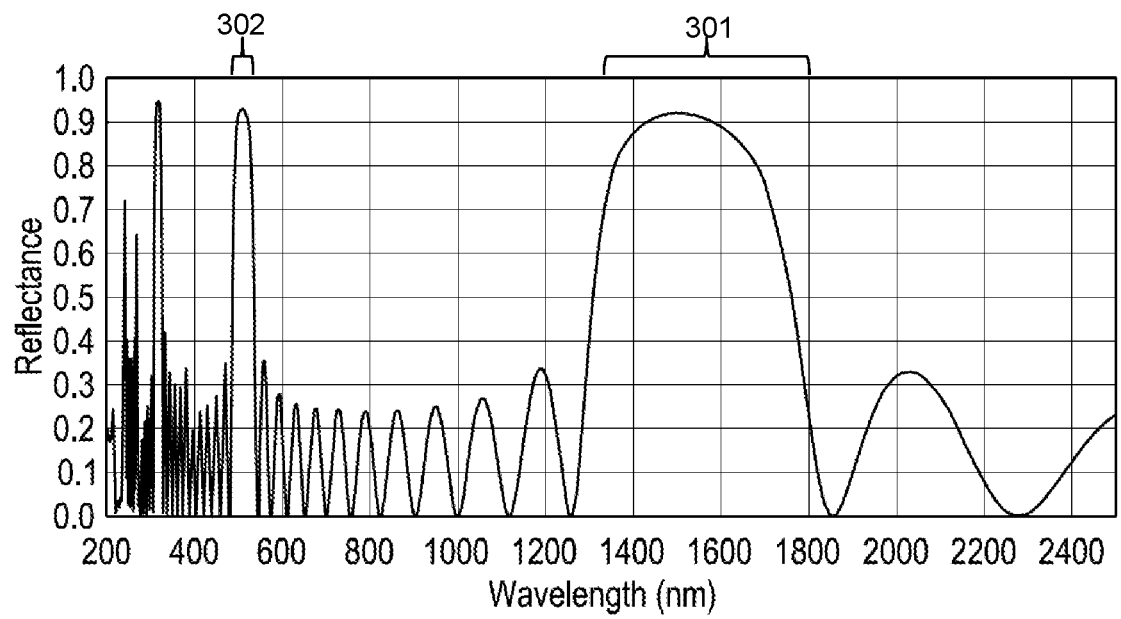
FIG. 3 shows the wavelength-dependent reflectance of a first exemplary interferometer.
Figure 4:
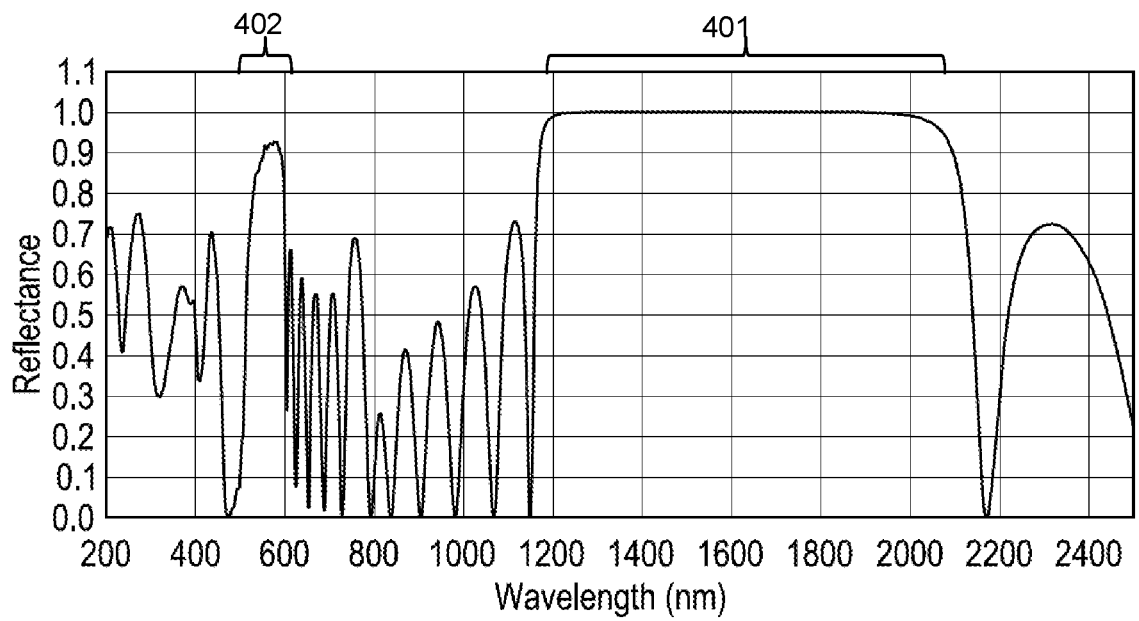
FIG. 4 shows the wavelength-dependent reflectance of a second exemplary interferometer.

The materials of the first and second mirrors may be selected to ensure good transmission within the wavelength ranges of the first and second detectors. For example, for visible light, metal mirrors generally provide good transmission. In the near-infra red spectrum, mirrors made from alternating layers of two materials, where one material has a greater refractive index than the other, will provide good transmission. The materials may be silicon compounds. For example, FIG. 3 shows the reflectance curve for an interferometer comprising mirrors formed from alternating layers of $Si_3N_4$ and $SiO_2$, with the main usable range 301 being between 1300 and 1800 nm (corresponding to the $4^{th}$ optical mode for a 400-450 nm system). By contrast, FIG. 4 shows the reflectance curve for an interferometer comprising mirrors formed from "poly-Si" and $SiO_2$, and the main usable range 401 is considerably larger—extending from around 1200 nm to over 2000 nm. In addition, both FIGS. 3 and 4 have a secondary usable range 302, 402 around 550 nm. When using these materials in the detector described with reference to FIG. 2, the first and second detectors may both have wavelength ranges within the main usable range, or one may have a wavelength range within the main usable range, and the other may have a wavelength range within the second usable range.

Further filters may be applied either before the interferometer, or between the interferometer and the detectors, to block light outside of the wavelength ranges of the detectors (thereby reducing interference).

In order to produce the different wavelength ranges, the first and second detectors may be implemented as:
- Two separate photodetectors, each with a different filter applied to them;
- Two photodetectors on the same die, each with a different filter applied to them;
- Two separate photodetectors, each made from a different material, optionally with different filters applied;
- Two photodetectors, formed at different depths within the same wafer;
- Two photodetectors, where one is formed on the upper side of the wafer, and one is formed on the lower side of the wafer.

Equivalent constructions may be used for more than two detectors.

Figure 5:
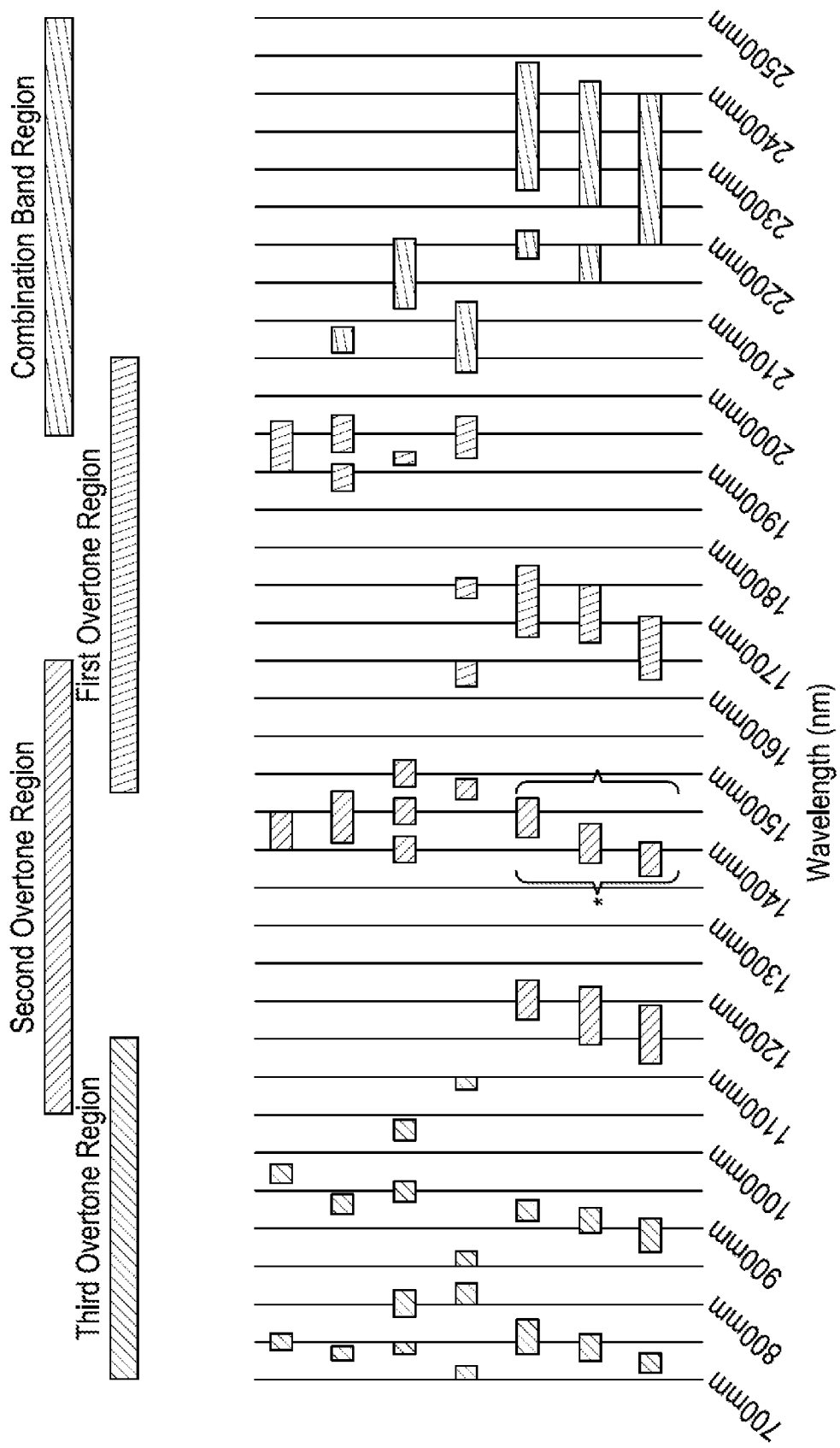
FIG. 5 shows example wavelengths of interest in spectroscopy.

While the sensor described above has many possible use cases, one particular use case is in spectroscopy. When detecting certain species in spectroscopy, each species has a characteristic set of "overtones", i.e. harmonics of the base emission wavelength of that species. However, the relationship of the base wavelength to the overtones is not purely harmonic—several overtones may be stronger, weaker, wider, or narrower than would be expected for purely harmonic behaviour. This is shown in the example of FIG. 5, for several species (each row of the chart corresponds to a species or group of closely related species). Therefore, by measuring simultaneously in corresponding wavelengths in e.g. the first and second overtone region, it is possible to get a more accurate determination of which species are present in the sample.

Embodiments of the present disclosure can be employed in many different applications including spectroscopy, proximity or time of flight sensing, color measurement, etc, for example, in scientific apparatus, security, automation, food technology, and other industries.

LIST OF REFERENCE NUMERALS

101 Interferometer
102 Top mirror
103 Bottom mirror
104 MEMS elements
105 Substrate
106 Detector
111 Wavelength range of detector
112 Minimum transmission peak
113 Maximum transmission peak
201 Interferometer
202 Top mirror
203 Bottom mirror
204 MEMS elements
205 Substrate
206 First detector
207 Second detector
211 Wavelength range of first detector
212 Wavelength range of second detector
213 Maximum transmission peak of first mode
214 Minimum transmission peak of first mode
215 Maximum transmission peak of second mode
216 Minimum transmission peak of second mode
301 Main usable range of interferometer
302 Secondary usable range of interferometer
401 Main usable range of interferometer
402 Secondary usable range of interferometer The skilled person will understand that in the preceding description and appended claims, positional terms such as 'above', 'along', 'side', etc. are made with reference to conceptual illustrations, such as those shown in the appended drawings. These terms are used for ease of reference but are not intended to be of limiting nature. These terms are therefore to be understood as referring to an object when in an orientation as shown in the accompanying drawings.

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in any embodiments, whether alone or in any appropriate combination with any other feature disclosed or illustrated herein.

Figure 2C:
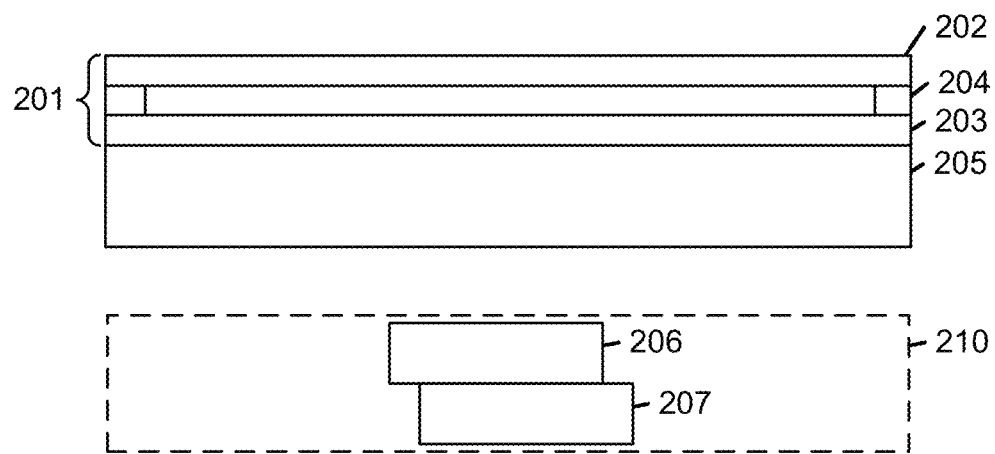
FIG. 2C is a schematic illustration of an exemplary optical sensor that includes two photodetectors formed at different depths within the same wafer.

An example of an optical sensor is shown in FIG. 2C, which is similar to the optical sensor of FIG. 2A in that it also includes an interferometer 201, which comprises a top mirror 202, a bottom mirror 203, and MEMS (micro-electromechanical system) elements 204 that control the spacing between the top mirror 202 and bottom mirror 203. The interferometer 201 is mounted on a substrate 205, and light which is transmitted by both the interferometer 201 and the substrate 205 may be picked up by a first photodetector 206 and a second photodetector 207. In FIG. 2C, the two photodetectors (206 and 207) are formed at different depths within the same wafer 210.

The invention claimed is:

1. An optical sensor comprising:
   a substrate;
   a Fabry-Perot interferometer comprising a first mirror and a second mirror, and mounted on the substrate such that light is transmitted through the Fabry-Perot interferometer to the substrate; and
   first and second photodetectors configured to detect light transmitted through the Fabry-Perot interferometer and the substrate, wherein the first and second photodetectors are formed at different depths within a same wafer and arranged such that light transmitted by the Fabry-Perot interferometer passes through the first photodetector before reaching the second photodetector,
   wherein
      the first photodetector is sensitive to a first wavelength range, and
      the second photodetector is sensitive to a second wavelength range, and
   wherein the first and second wavelength ranges each correspond to a different mode of the Fabry-Perot interferometer,
   wherein each mirror has a main usable range and a secondary usable range, wherein the main usable range is from 1200 to 2000 nm or from 1300 to 1800 nm, wherein the secondary usable range is about 550 nm,
   wherein the first wavelength range is within the main usable range and the second wavelength range is within the second usable range.

2. An optical sensor according to claim 1, wherein the first photodetector is transparent to the second wavelength range, and the second photodetector is located such that light transmitted by the Fabry-Perot interferometer passes through the first photodetector before reaching the second photodetector.

3. An optical sensor according to claim 1, wherein the wafer is arranged such that light transmitted by the Fabry-Perot interferometer passes through the first photodetector before reaching the second photodetector.

4. An optical sensor according to claim 1, wherein the first photodetector comprises an optical filter which blocks at least the second wavelength range and transmits the first wavelength range, and the second photodetector comprises an optical filter which blocks at least the first wavelength range and transmits the second wavelength range.

* * * * *